United States Patent
Krahn et al.

(10) Patent No.: US 9,012,060 B2
(45) Date of Patent: Apr. 21, 2015

(54) SYSTEM AND METHOD FOR BATTERY INSULATION

(71) Applicant: General Electric Company, Schenectady, NY (US)

(72) Inventors: John Raymond Krahn, Schenectady, NY (US); Kristopher John Frutschy, Schenectady, NY (US); Narayan Subramanian, Clifton Park, NY (US); William Patrick Waters, Scotia, NY (US); Daniel Qi Tan, Rexford, NY (US); William Hubert Schank, Howell, MI (US)

(73) Assignee: General Electric Company, Niskayuna, NY (US)

( * ) Notice: Subject to any disclaimer, the term of this patent is extended or adjusted under 35 U.S.C. 154(b) by 161 days.

(21) Appl. No.: 13/726,846

(22) Filed: Dec. 26, 2012

(65) Prior Publication Data

US 2014/0178742 A1    Jun. 26, 2014

(51) Int. Cl.
*H01M 2/02* (2006.01)
*H01M 2/06* (2006.01)

(52) U.S. Cl.
CPC ............ *H01M 2/06* (2013.01); *H01M 2/022* (2013.01); *H01M 2/0242* (2013.01); *H01M 2/028* (2013.01); *H01M 2/0282* (2013.01)

(58) Field of Classification Search
USPC .......................... 429/151, 130, 163, 167, 246
See application file for complete search history.

(56) References Cited

U.S. PATENT DOCUMENTS

| | | | |
|---|---|---|---|
| 3,859,133 A * | 1/1975 | Dickfeldt et al. | 429/176 |
| 4,546,056 A | 10/1985 | Jessen et al. | |
| 4,999,262 A * | 3/1991 | Prince | 429/104 |
| 5,447,808 A * | 9/1995 | Molyneux | 429/158 |
| 6,010,543 A * | 1/2000 | Berkey et al. | 29/623.2 |
| 7,157,182 B2 | 1/2007 | Wada et al. | |
| 7,578,702 B1 | 8/2009 | Tom et al. | |
| 7,960,069 B2 | 6/2011 | Crumm et al. | |
| 8,088,510 B2 | 1/2012 | Fujikawa et al. | |
| 2006/0093922 A1* | 5/2006 | Kim et al. | 429/251 |
| 2012/0028086 A1 | 2/2012 | Shi et al. | |

FOREIGN PATENT DOCUMENTS

| | | |
|---|---|---|
| CN | 201402845 Y | 2/2010 |
| JP | 8180884 A | 7/1996 |
| WO | 2009001739 A1 | 12/2008 |

OTHER PUBLICATIONS

"Battery Sleeve Insulation", Insulation Sleeves From Electrolock Inc, Product Catalogue.

* cited by examiner

*Primary Examiner* — Stewart Fraser
*Assistant Examiner* — Olatunji Godo
(74) *Attorney, Agent, or Firm* — Joseph J. Christian

(57) ABSTRACT

In accordance with an embodiment of the invention, an assembly of tubular cell insulator casings is provided. The assembly includes a plurality of tubular cell insulator casings, wherein each cell insulator casing is open at a top end and configured to surround at least one of a plurality of electrically interconnected electrochemical cells, wherein said plurality of tubular cell insulator casings comprises a monolithic unit. The battery pack also includes a plurality of insulator plugs and a sump plate configured to support said plurality of insulator plugs.

17 Claims, 6 Drawing Sheets

SYSTEM AND METHOD FOR BATTERY INSULATION

CROSS REFERENCE TO RELATED APPLICATIONS

This application is related in parts to commonly assigned, U.S. application Ser. No. 13/234,638 entitled "STRUCTURE, PACKAGING ASSEMBLY, AND COVER FOR MULTI-CELL ARRAY BATTERIES", filed on Sep. 16, 2011, which is herein incorporated by reference.

BACKGROUND

The invention relates generally to battery cells, and more specifically to insulation of battery cells.

Traditionally, individual sheets of mica 'heater plate' are used in battery packs to provide electrical insulation between battery cells and any other surface that is at ground potential. Such an approach is costly because many different shapes need to be cut and stored before actual manufacturing. Further, there are many different types of batteries, such as batteries for telecommunications, un-interruptible power supplies, and vehicular usage and so on. Such various geometries and uses make the issue of manufacturing and storing and processing of insulation sheets even more complex.

One other disadvantage associated with current design of battery pack insulation is: in case of failure of one cell, the electrotype released from one cell leaks out and causes failure of many more cells in the same or neighboring battery packs.

Thus, there is need for improvement in the design of insulation systems such that there are fewer parts to warehouse, higher reliability in manufacturing and less chance failure due to leakage of cells in a battery pack.

BRIEF DESCRIPTION

In accordance with an embodiment of the invention, an assembly of tubular cell insulator casings is provided. The assembly includes an assembly of battery cell insulator casings, a plurality of insulator plugs and a sump plate. The assembly of battery cell insulators includes a plurality of tubular cell insulator casings, wherein each cell insulator casing is open at a top end and configured to surround at least one of a plurality of electrically interconnected electrochemical cells, wherein said plurality of tubular cell insulator casings comprises a monolithic unit. Further, each of the plurality of insulator plugs correspond to one of the plurality of tubular cell insulator casings, is positioned below the bottom of the one of the plurality of tubular cell insulator casings and is configured to support and insulate the battery cell corresponding to the one of the plurality of tubular cell insulator casings. Further, the sump plate is configured to support said plurality of insulator plugs.

In accordance with an embodiment of the invention, a battery pack is provided. The battery pack includes a plurality of electrically interconnected electrochemical cells, a plurality of tubular cell insulator casings, a plurality of insulator plugs and a sump plate. Each cell insulator casing is open at a top end and configured to surround at least one of said plurality of electrically interconnected electrochemical cells. Further, each of the plurality of insulator plugs correspond to one of the plurality of tubular cell insulator casings, is positioned below the bottom of the one of the plurality of tubular cell insulator casings and is configured to support and insulate the battery cell corresponding to the one of the plurality of tubular cell insulator casings. Further, the sump plate is configured to support said plurality of insulator plugs.

In accordance with an embodiment of the invention, a method of manufacturing an assembly of tubular cell insulator casings is provided. The method includes insulating each of a plurality of battery cells, wherein the insulating includes providing a plurality of tubular battery cell insulator casings in a monolithic configuration. The method further includes positioning each of said plurality of electrically interconnected electrochemical cells within one of said plurality of cell insulator casings, wherein each cell insulator casing is open at a top end.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
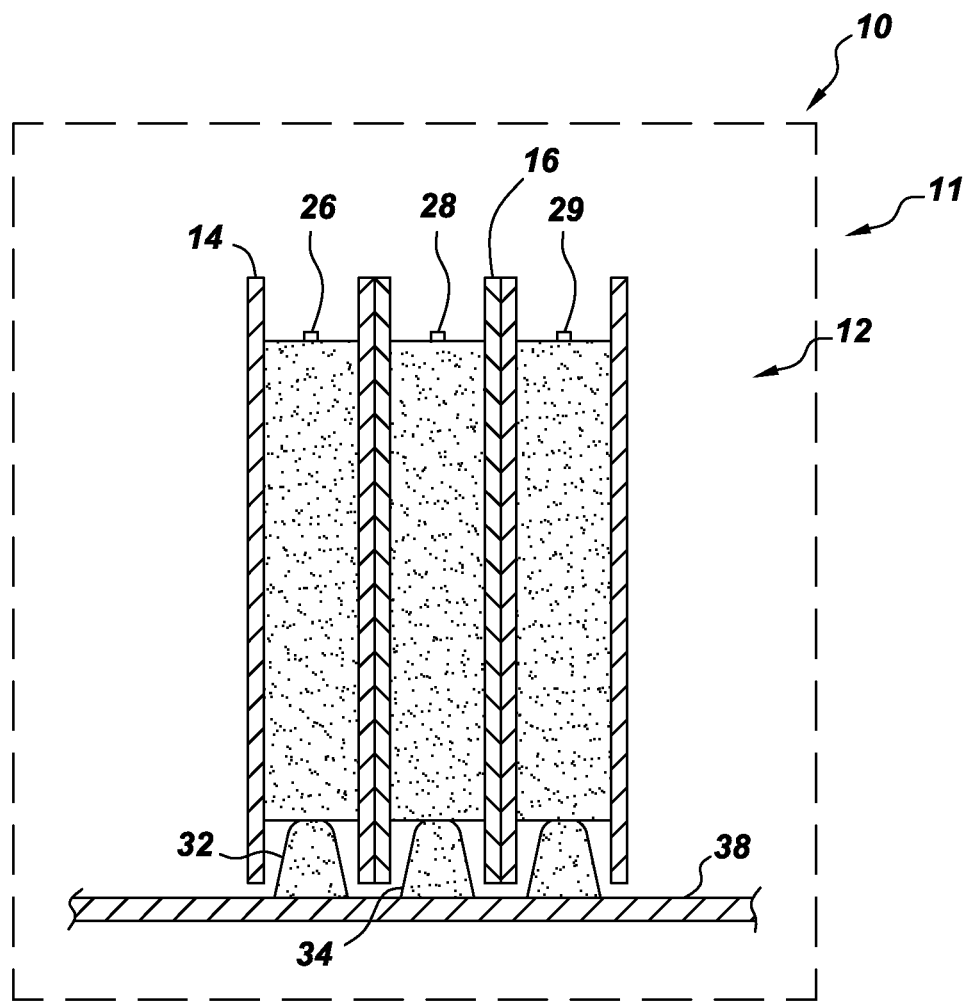
FIG. 1 is a diagrammatical representation of a system for battery insulation.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. Of course, it is to be understood that not necessarily all such objects or advantages described above may be achieved in accordance with any particular embodiment. Thus, for example, those skilled in the art will recognize that the assemblies and techniques described herein may be embodied or carried out in a manner that achieves or optimizes one advantage or group of advantages as taught herein without necessarily achieving other objects or advantages as may be taught or suggested herein.

Traditionally, individual sheets of mica 'heater plate' are used in battery packs to provide electrical insulation between battery cells and any other surface that is at ground potential. Such an approach is costly because many different shapes need to be cut and stored before actual manufacturing. Further, there are many different types of batteries, such as batteries for telecommunications, un-interruptible power supplies, and vehicular usage and so on. Such various geometries and uses make the issue of manufacturing and storing and processing of insulation sheets even more complex. Thus, manufacturing and using an insulation system that is operationalized at the individual battery cell level, rather than at a system or battery pack level, offers significant advantages such as fewer parts to warehouse, higher reliability manufacturing and many such alike. Various embodiments of one such enhanced insulation system and method are described below with help of FIGS. 1-10.

In accordance with one embodiment of the invention, a battery insulation system 10 is provided. The battery insulation system 10 includes a battery pack 11. The battery pack 11 includes a number of exemplary battery cells 26, 28 etc. The battery pack 11 also includes an assembly 12 of exemplary battery cell insulator casings, a number of exemplary insulator plugs 32, 34 and a sump plate 38. The assembly 12 of battery cell insulator casings includes a number of exemplary tubular battery cell insulator casings 14, 16 etc.

Figure 2:
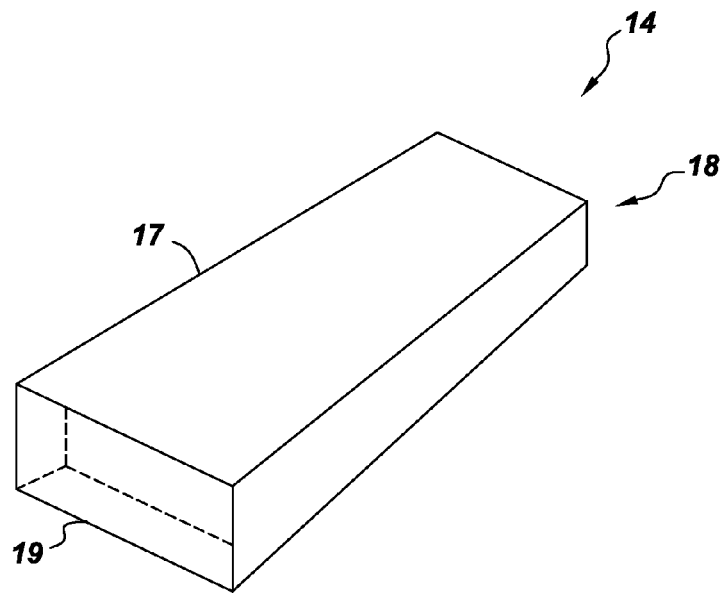
FIG. 2 is a diagrammatical representation of an exemplary first battery insulator casing.
Figure 3:
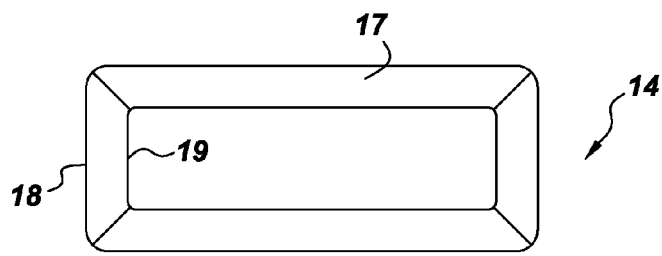
FIG. 3 is an alternative diagrammatical representation of the exemplary first battery insulator casing of system of FIG. 1.

FIG. 2 is a diagrammatical representation of an exemplary first battery insulator casing 14. FIG. 3 is an alternative diagrammatical representation of the exemplary first battery insulator casing 14 of system of FIG. 1 and FIG. 2. The first exemplary battery insulator casing 14 is made up of a tubular wall 17 and is open at its top end 18 as well as at bottom end 19. In a similar manner, the second exemplary battery insulator casing 16 is made up of a tubular wall 21 and is open at its top end 18 as well as at bottom end 19. In another embodiment of the invention, the bottom ends of some of the tubular cell insulator casings may be at least partially closed.

Figure 4:
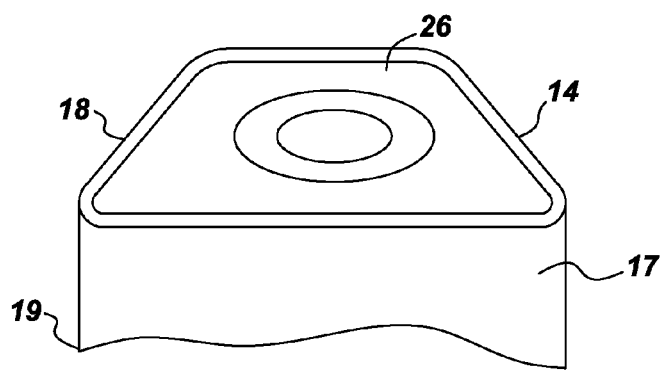
FIG. 4 is an alternative diagrammatical representation of an exemplary first battery insulator casing and a battery within the battery insulator casing of system of FIG. 1.

FIG. 4 is an alternative diagrammatical representation of an exemplary first battery insulator casing and an exemplary battery housed within the battery cell insulator casing of system of FIG. 1. Likewise, each of the exemplary battery cell insulator casings houses and insulates an exemplary battery cell in such a manner that an inner surface of the tubular cell insulator casings touches an exterior surface of the electrically interconnected battery cells. In one embodiment of the invention, first battery cell 26 is housed within battery insulator casing 14 and second battery cell 28 is housed within battery cell insulator casing 16. Further, the cell insulator casings 14 and 16 are in physical contact in such a manner that the tubular walls 17 and 21 create a common insulating interface between two adjacent battery cells 26 and 28. In another embodiment of the invention, a distance may be typically defined between an inner surface of the tubular cell insulator casings and an exterior surface of the electrically interconnected battery cells. Further, in another embodiment of the invention, cross-sectional shape of the tubular cell insulator casings may be configured to match the cross-sectional shape of the electrically interconnected battery cells.

Further, exemplary insulator plugs 32 and 34 are positioned in a manner such that each of the exemplary insulator plugs 32 and 34 corresponds to one of the exemplary cell insulator casings 14 and 16. Furthermore, the insulator plugs 32 and 34 are positioned below the cell insulator casings 14 and 16 in such a manner that insulator plug 32 supports and insulates the battery cell 26 from its bottom. In a similar manner, insulator plug 34 supports and insulates the battery cell 28 from its bottom. Further, the sump plate 38 is positioned below the assembly of battery cell insulators 12 and the insulator plugs 32 and 34. The sump plate 38 supports the exemplary insulator plugs 32 and 34 and thereby supports the whole battery pack 11. Typically, the tubular cell insulator casings and the sump plate are separated by a predetermined clearance distance The insulation system and method disclosed and described in relation to FIGS. 1-4 herein provide double insulation between individual battery cells and thereby greatly reduces risk of cell-to-cell shorting due to incoming defects in the insulation or cracking due to mechanical loading. Further, from a manufacturing perspective, it is less expensive to warehouse just one part, rather than many. Furthermore, from a quality perspective, the insulation system and method disclosed and described above has several advantages over traditional battery pack designs wherein individual sheets of mica are used and thereby prone to defect producing occurrences such as misplacement, folding-over, inappropriate size matching etc.

Referring to FIGS. 1-4 once more, in one embodiment of the invention, each of the exemplary battery cell insulator casings 14 and 16 is made of a high temperature dielectric material. The high temperature dielectric material may include materials such as mica, ceramic composites, fiber-filled composites, and high temperature silicone thermosets. The operating temperature of such a battery pack 11 may typically be within the range of temperature between 300° C. and 350° C. In one particular embodiment of the invention, the high temperature dielectric material has an exemplary voltage withstand value of at least 100V DC continuous.

Referring to FIG. 1, the exemplary insulator plugs 32 and 34 are typically made up of ceramic material. Within the battery pack 11, the assembly 12 of battery cell insulators and the sump plate 38 are separated by a predetermined clearance distance. The tubular design of the exemplary battery cell insulator casings 14, 16, the insulator plugs 32 and 34 and the clearance gap between battery cell insulator casings and the sump plate 38, in combination ensure that the whole battery pack 11 does not fail in case of failure of an individual battery cell and consequent release of electrotype release from the failed battery cell. In the event of failure of a battery cell and release of liquid electrolyte, the design of the battery insulation system 10 ensures that the leaking electrolyte accumulate in a locality near the failed cell only, typically known as metal containment zone. Thus, any cascading failure in the neighboring cells is prevented, because there is no gap in the insulation between the cells where the electrolyte can possibly flow.

Figure 5:
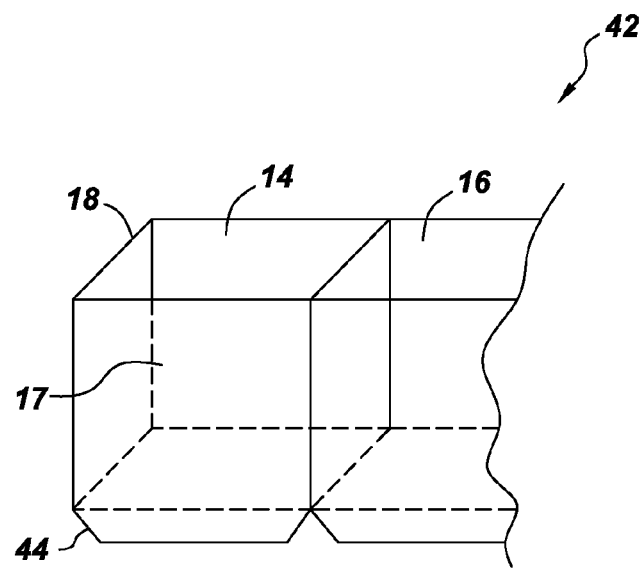
FIG. 5 is a diagrammatical representation of an alternative embodiment of an assembly of battery insulator casings.

FIG. 5 is a diagrammatical representation of an alternative embodiment 42 of assembly 12 of battery insulator casings of FIG. 1. Referring to FIG. 5, in the assembly 42 of the battery insulator casings, the bottom ends 44 of the exemplary battery cell insulator casings 14, 16 etc. are typically tapered in order to interlock the exemplary battery cells 26, 28 etc. housed within. Specifically, the tapered configuration of the bottom ends 44 of the battery cell insulator casings 14, 16 typically prevents the casings 14, 16 etc. from sliding up the battery cells 26, 28 etc. housed within, in case of external stresses such as vibration or thermal-cycling.

Figure 6:
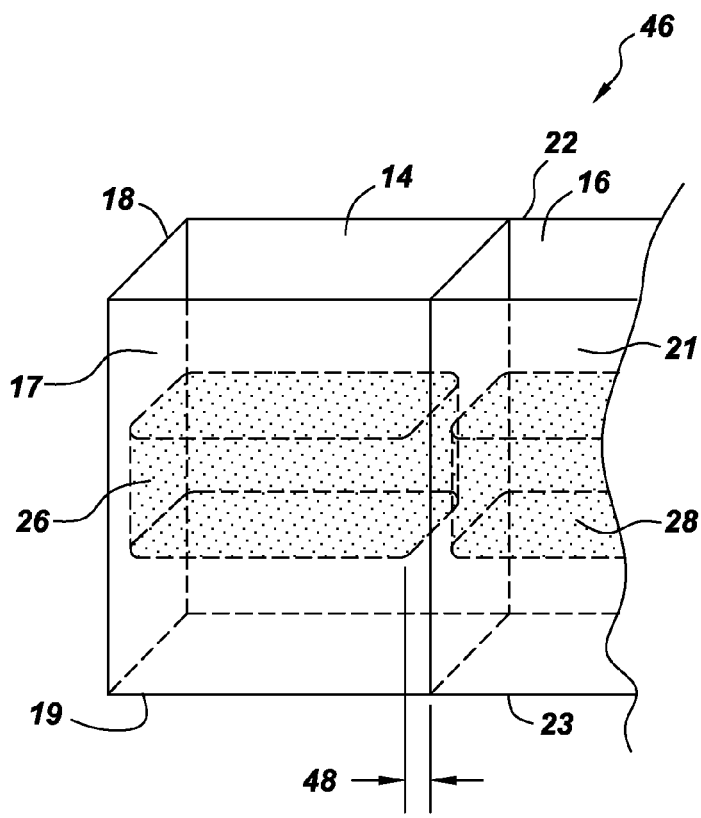
FIG. 6 is a diagrammatical representation of an exemplary first battery insulator casing and a battery within the battery insulator casing.

FIG. 6 is a diagrammatical representation of an alternative embodiment 46 of assembly 12 of battery insulator casings of FIG. 1. Referring to FIG. 6, in the assembly 46 of the battery insulator casings, the battery cell insulator casings 14, 16 etc. are configured to extend past the battery cells 26, 28 etc. respectively housed within, either at the top ends 18, 22 or at the bottom ends 19, 23 or at both ends. Specifically, the extended configuration of the top and/or bottom ends 44 of the battery cell insulator casings 14, 16 typically increase creepage distance in the event of failure of one or more battery cells. Further, there may be gaps 48 typically inserted between the battery cells 26, 28 and the inner surfaces of the tubular walls 17, 21 etc. of the battery cell insulator casings 14, 16 respectively and the gaps may be leveraged to provide additional safety in the event of failure of one or more battery cells.

Creepage distance, in a cell is typically designed in a manner such that surface flash-over prevented. Surface flash-over, in turn is driven primarily by the stress at a triple-point related typically to air, metal and the insulator in context. Further, Surface flash-over is influenced most by dirt or moisture or other contamination on the surface that relates to cell rupture. Increasing the creepage distance, typically increases the margin of safety in the design of the cell and higher the creepage distance is better designed is the cell from a failure point of view.

Figure 7:
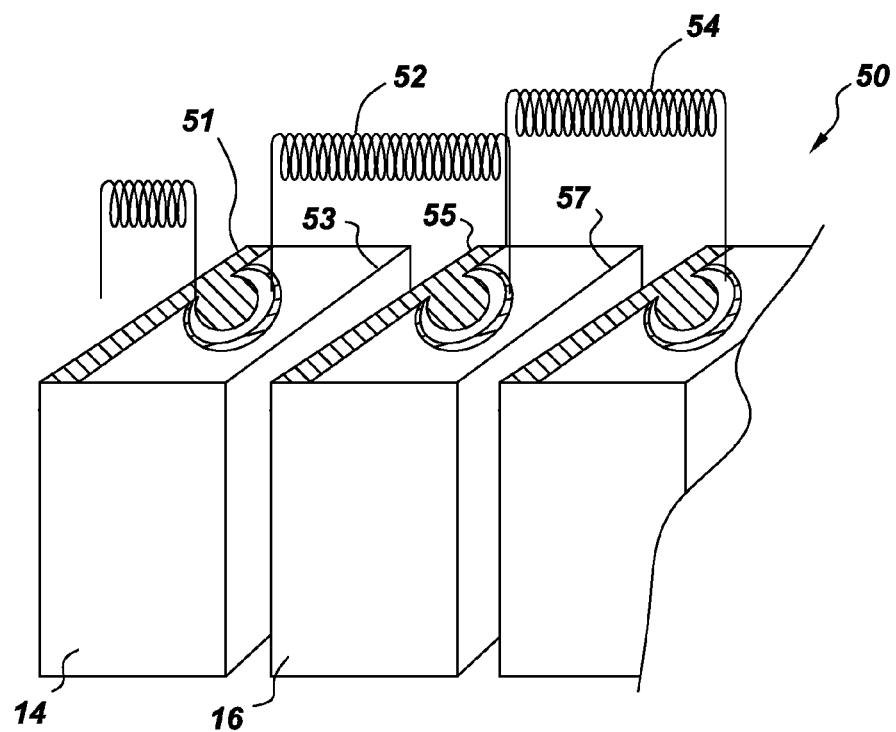
FIG. 7 is a diagrammatical representation of an alternative embodiment of battery insulator casings.

FIG. 7 is a diagrammatical representation of an alternative embodiment 50 of assembly 12 of battery insulator casings of FIG. 1. Referring to FIG. 7, in the assembly 50 of the battery insulator casings, the battery cell insulator casings 14, 16 etc. are configured such that the top ends of two adjacent cell insulator casings are mechanically configured with connecting elements at the top ends to connect the electrochemical cells and make electrical interconnection. Referring to FIG. 7 again, 51 and 53 are the keyed first side and second sides respectively of the top end of the first battery insulator casing 14. In a similar manner, 55 and 57 are the keyed first side and second sides respectively of the top end of the second battery insulator casing 16. Keyed sides 53 and 55 are electrically connected to form electrical interconnection 52 between first and second of battery insulator casings 14 and 16. In a similar manner, electrical interconnection 54 may be formed between second and third battery insulator casings. In all such electrical interconnections, the tubular walls 17, 19 of the exemplary battery insulator casings 14, 16 etc. act as anodes and the battery cells 26, 28 etc. respectively housed within, act as cathodes.

Figure 8:
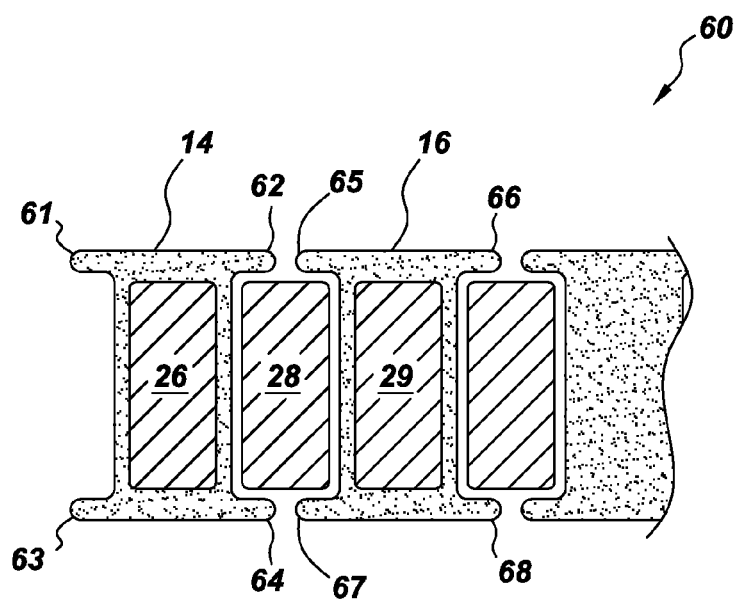
FIG. 8 is a diagrammatical representation of an alternative embodiment of an assembly of battery insulator casings.

FIG. 8 is a diagrammatical representation of an alternative embodiment 60 of assembly 12 of battery insulator casings of FIG. 1. Referring to FIG. 8, in the assembly 60 of the battery insulator casings, the battery cell insulator casings are configured such that the corners of the top ends and the bottom ends of two adjacent cell insulator casings 14, 16 are mechanically configured with a number of extensions, each extending from a corner of one of said plurality of cell insulator casings. Further, the extensions are configured to abut an adjacent extension and thereby interlock the two adjacent cell insulator casings. Referring to FIGS. 8, 61 and 62 are the keyed first and second corners respectively of the top end of the first battery insulator casing 14 and 63 and 64 are the keyed first and second corners of the bottom end of the first battery insulator casing 14. Similarly, 65 and 66 are the keyed first and second corners respectively of the top end of the second battery insulator casing 14 and 67 and 68 are the keyed first and second corners of the bottom end of the second battery insulator casing 16. Referring to FIG. 8 once more, corner 62 mates corner 65 with a gap in-between and corner 64 mates corner 67 with a gap in-between. Thus, the two exemplary battery insulator casings 14 and 16 encase three exemplary battery cells 26, 28 and 29 within and this way, only every other battery cell is enclosed in a respective battery cell insulator casing, thereby reducing the number of parts to half of the original configuration as in FIG. 1.

Figure 11:
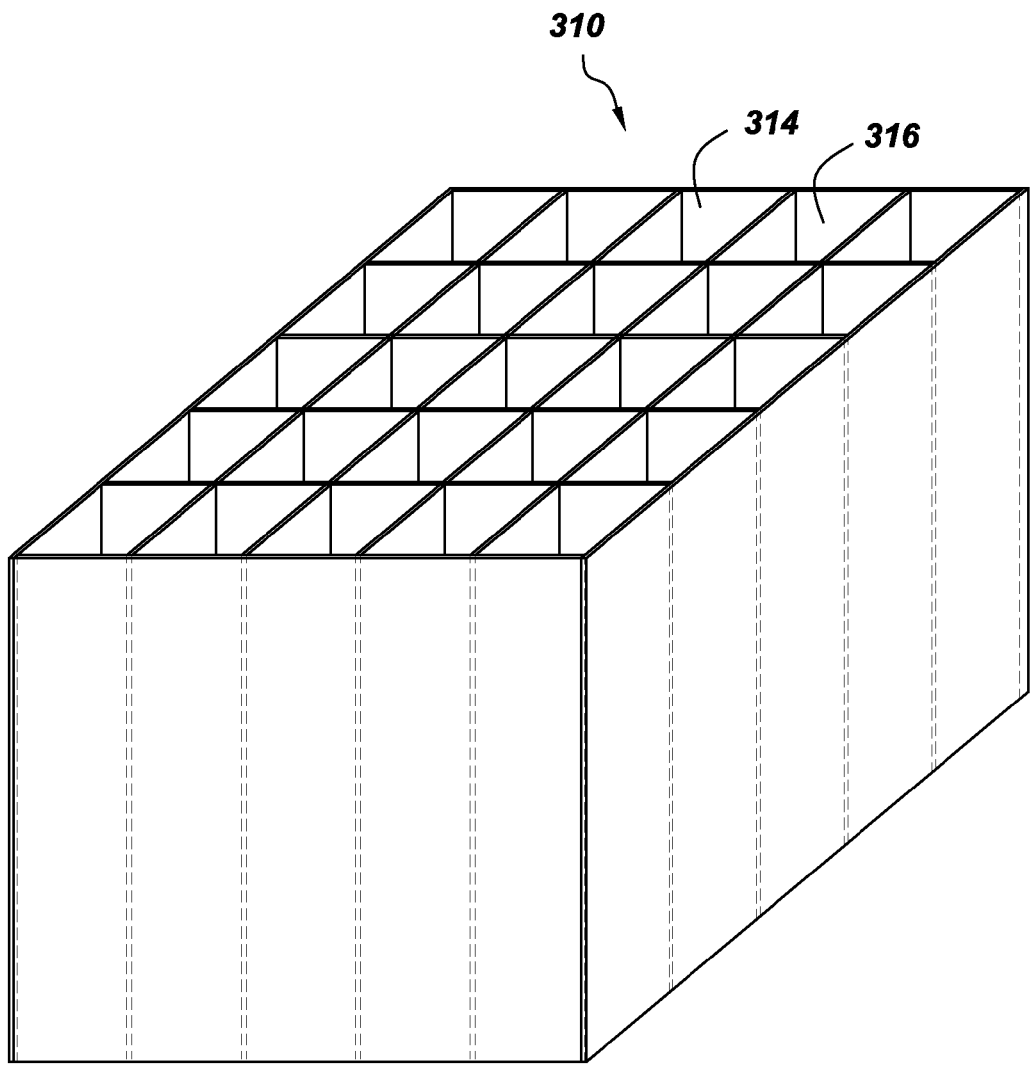
FIG. 11 is a diagrammatical representation of a monolithic embodiment of an assembly of battery insulator casings.

FIG. 11 is a diagrammatical representation of an alternative embodiment 300 of the assembly 12 of battery insulator casings of FIG. 1. Referring to FIG. 11, the assembly 300 of the battery insulator casings is configured as a monolithic unit comprising a number of exemplary battery cell insulator casings such as first battery cell insulator casing 314 and 316 second battery cell insulator casing and so on. In one particular embodiment of the invention, the monolithic unit 300 may be configured as a honeycomb structure.

Figure 9:
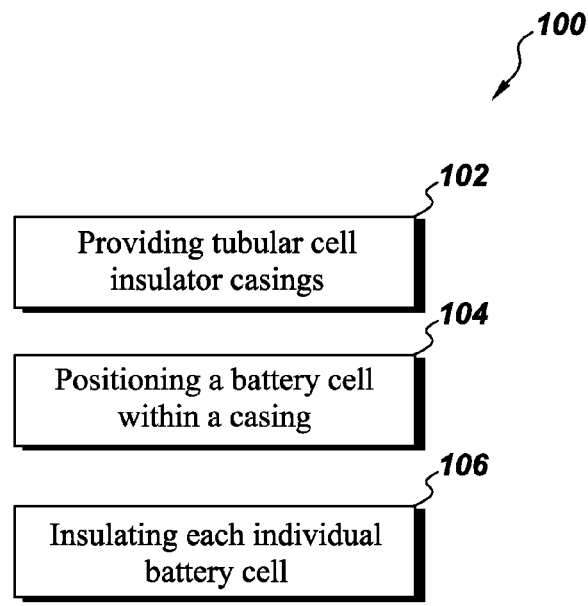
FIG. 9 is a flow chart of an exemplary method of manufacturing of the system of FIG. 1 in accordance with an embodiment of the present invention.

FIG. 9 is a flow chart of an exemplary method of manufacturing of the system of FIG. 1 in accordance with an embodiment of the present invention. Referring to FIG. 9, the method 100 describes how each of a plurality of battery cells insulated in accordance with one embodiment of the invention. The method 100 includes providing a plurality of tubular battery cell insulator casings as in step 102. The method 100 further includes positioning each of the plurality of cell insulator casings in contact with at least one other of the plurality of tubular battery cell casings as in step 102. Each cell insulator casing is open at a top end and at a bottom end and configured to insulate a battery cell. The method 100 also includes positioning each of the plurality of battery cells within a corresponding one of the plurality of cell insulator casings as in step 106 and thereby insulating each battery cell as in step 108.

In another embodiment of the method 100, the method further includes providing a plurality of insulator plugs, wherein each of the plurality of insulator plugs, correspond to one of the plurality of cell insulator casings. Further, each of the plurality of insulator plugs is positioned the at least one insulator plug below the bottom of the one of the plurality of cell insulator casings. The method 100 further includes configuring the at least one insulator plug to support and to insulate the battery cell corresponding to the one of the plurality of cell insulator casings. The method 100 also includes positioning a sump plate below the assembly of battery cell insulators and the plurality of insulator plugs and configuring the sump plate to support the plurality of insulator plugs.

Figure 10:
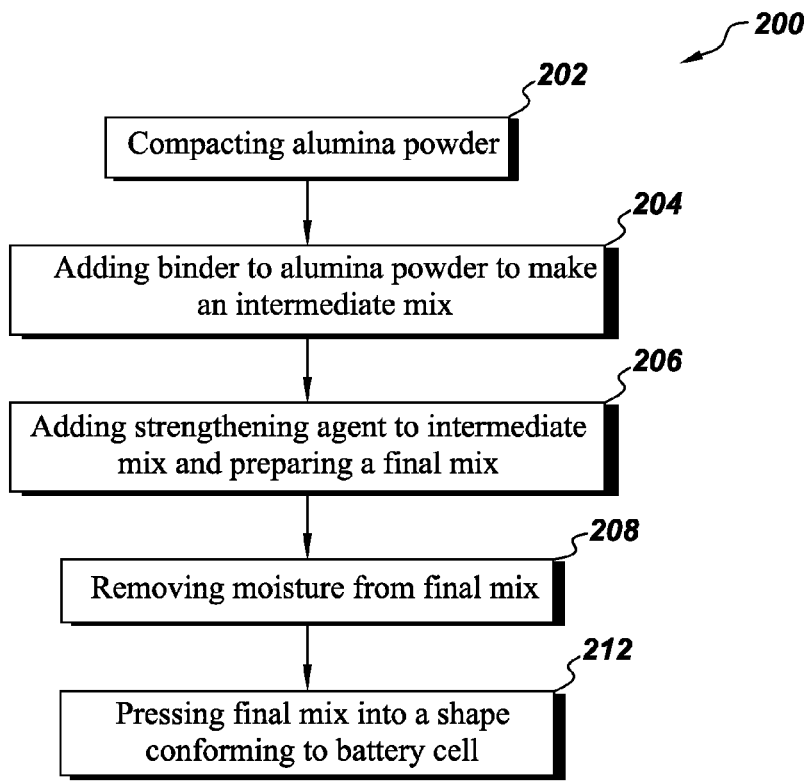
FIG. 10 is a flow chart of an exemplary alternative method of manufacturing of the system of FIG. 1 in accordance with an embodiment of the present invention.

FIG. 10 is a flow chart of an exemplary alternative method of manufacturing of the system of FIG. 1 in accordance with an embodiment of the present invention. Referring to FIG. 10, the method 200 describes how the battery cell insulator casings may be formed from alumina powder. The method includes compacting the alumina powder as in step 202 and then adding a binder to the alumina powder to prepare an intermediate mix as in step 204. The method 200 further includes adding a strengthening agent to the intermediate mix of the binder and the alumina powder to prepare a final mix as in step 206. The method also includes removing moisture from the final mix as in step 208 and then pressing the final mix into a shape conforming to the battery cell as in step 212.

In summary, in one embodiment of the invention, an assembly of tubular cell insulator casings is provided. The assembly includes an assembly of battery cell insulator casings, a plurality of insulator plugs and a sump plate. The assembly of battery cell insulators includes a plurality of tubular cell insulator casings, wherein each cell insulator casing is open at a top end and configured to surround at least one of a plurality of electrically interconnected electrochemical cells, wherein said plurality of tubular cell insulator casings comprises a monolithic unit. Further, each of the plurality of insulator plugs correspond to one of the plurality of tubular cell insulator casings, is positioned below the bottom of the one of the plurality of tubular cell insulator casings and is configured to support and insulate the battery cell corresponding to the one of the plurality of tubular cell insulator casings. Further, the sump plate is configured to support said plurality of insulator plugs.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. Of course, it is to be understood that not necessarily all such objects or advantages described above may be achieved in accordance with any particular embodiment. Thus, for example, those skilled in the art will recognize that the assemblies and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An assembly of tubular cell insulator casings comprising:
   a monolithic assembly comprising: a plurality of tubular cell insulator casings, wherein each tubular cell insulator casing is open at a top end and open at a bottom end and configured to surround at least one of a plurality of electrically interconnected electrochemical cells and wherein each tubular cell insulator casing is in physical contact with an adjoining tubular cell insulator casing, wherein each tubular cell insulator casing is made of a high temperature dielectric material, comprising at least one of: recycled alumina powder, ceramic composites, fiber-filled composites and high temperature silicone thermosets, wherein said dielectric material comprises material with voltage withstand value of at least 100V DC continuous;
   a plurality of insulator plugs, wherein at least one of said plurality of insulator plugs:
     corresponds to said at least one of said plurality of tubular cell insulator casings;
     is positioned below said at least one of said plurality of tubular cell insulator casings;
     is configured to support and to insulate said electrochemical cell corresponding to said at least one of said plurality of tubular cell insulator casings; and
   a sump plate configured to support said plurality of insulator plugs, wherein the sump plate extends below and extends across the whole assembly of tubular cell insulator casings.

2. The assembly of claim 1, wherein said monolithic unit comprises a honeycomb structure.

3. The assembly of claim 1, wherein said high temperature comprises a temperature between about 300° C. and about 350° C.

4. The assembly of claim 1, wherein said plurality of tubular cell insulator casings are configured to withstand a temperature of at least about 200° C.

5. The assembly of claim 1, further comprising a connecting element at said top end configured to connect said electrochemical cells.

6. The assembly of claim 1, wherein said plurality of cell insulator casings further comprise a plurality of extensions, each extending from a corner of one of said plurality of cell insulator casings, wherein said extension is configured to abut an adjacent extension.

7. The assembly of claim 1, wherein each of said plurality of insulator plugs comprises a ceramic material.

8. The assembly of claim 1, wherein said plurality of tubular cell insulator casings and said sump plate are separated by a predetermined clearance distance.

9. The assembly of claim 1, wherein an inner surface of said plurality of tubular cell insulator casings touches an exterior surface of said plurality of electrically interconnected electrochemical cells.

10. The assembly of claim 1, wherein a distance is defined between an inner surface of said plurality of tubular cell insulator casings and an exterior surface of said plurality of electrically interconnected electrochemical cells.

11. The assembly of claim 1, wherein a portion of said plurality of tubular cell insulator casings extends over a portion of said plurality of electrically interconnected electrochemical cells.

12. The assembly of claim 1, wherein a cross-sectional shape of said plurality of tubular cell insulator casings matches a cross-sectional shape of said plurality of electrically interconnected electrochemical cells.

13. The assembly of claim 1, wherein each tubular cell insulator casing is made of mica.

14. A battery pack comprising:
    a monolithic assembly comprising: a plurality of tubular cell insulator casings, wherein each tubular cell insulator casing is open at a top end and open at a bottom end and configured to surround at least one of said plurality of electrically interconnected electrochemical cells and wherein each tubular cell insulator casing is in physical contact with an adjoining tubular cell insulator casing, wherein each tubular cell insulator casing is made of a high temperature dielectric material, comprising at least one of: recycled alumina powder, ceramic composites, fiber-filled composites and high temperature silicone thermosets, wherein said dielectric material comprises material with voltage withstand value of at least 100V DC continuous;
    a plurality of insulator plugs, wherein at least one of said plurality of insulator plugs:
      corresponds to said at least one of said plurality of tubular cell insulator casings;
      is positioned below said at least one of said plurality of tubular cell insulator casings;
      is configured to support and to insulate said electrochemical cell corresponding to said at least one of said plurality of tubular cell insulator casings; and
    a sump plate configured to support said plurality of insulator plugs, wherein the sump plate extends below and extends across the whole assembly of tubular cell insulator casings.

15. The battery pack of claim 14, wherein said plurality of cell insulator casings further comprise a plurality of extensions, each extending from a corner of one of said plurality of cell insulator casings, wherein said extension is configured to abut an adjacent extension.

16. The battery pack of claim 14, wherein a bottom end of at least one of said plurality of tubular cell insulator casings is tapered to interlock corresponding electrochemical cell.

17. The battery pack of claim 14, wherein a bottom end of at least one of said plurality of tubular cell insulator casings is at least partially closed.

* * * * *

UNITED STATES PATENT AND TRADEMARK OFFICE
CERTIFICATE OF CORRECTION

PATENT NO. : 9,012,060 B2
APPLICATION NO. : 13/726846
DATED : April 21, 2015
INVENTOR(S) : Krahn et al.

It is certified that error appears in the above-identified patent and that said Letters Patent is hereby corrected as shown below:

In the claims,

In Column 8, Line 33, in Claim 14,
insert -- a plurality of electrically interconnected electrochemical cells; --, as a new subpoint.

Signed and Sealed this
Thirteenth Day of October, 2015

Michelle K. Lee
*Director of the United States Patent and Trademark Office*